United States Patent
Lei et al.

(10) Patent No.: US 11,232,025 B2
(45) Date of Patent: Jan. 25, 2022

(54) METHOD, DEVICE AND COMPUTER PROGRAM PRODUCT FOR STORAGE MANAGEMENT

(71) Applicant: EMC IP Holding Company LLC, Hopkinton, MA (US)

(72) Inventors: Lu Lei, Shanghai (CN); Young Yangchun Wu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/557,949

(22) Filed: Aug. 30, 2019

(65) Prior Publication Data

US 2020/0341893 A1    Oct. 29, 2020

(30) Foreign Application Priority Data

Apr. 29, 2019   (CN) .......................... 201910356190.3

(51) Int. Cl.
*G06F 12/02* (2006.01)
*G06F 16/23* (2019.01)
*G06F 16/22* (2019.01)

(52) U.S. Cl.
CPC ...... *G06F 12/0253* (2013.01); *G06F 16/2246* (2019.01); *G06F 16/2379* (2019.01); *G06F 2212/1044* (2013.01)

(58) Field of Classification Search
CPC ............. G06F 12/0253; G06F 16/2379; G06F 16/2246; G06F 2212/1044; G06F 12/00; G06F 13/00
See application file for complete search history.

(56) References Cited

U.S. PATENT DOCUMENTS

| | | | |
|---|---|---|---|
| 8,386,717 B1* | 2/2013 | Banerjee | G06F 12/123 711/136 |
| 2011/0093464 A1* | 4/2011 | Cvet | G06F 16/355 707/737 |
| 2015/0012567 A1* | 1/2015 | Powell | G06F 16/188 707/809 |
| 2016/0188219 A1* | 6/2016 | Peterson | G06F 12/0246 711/103 |
| 2018/0004798 A1* | 1/2018 | Kimura | G06F 12/0238 |

* cited by examiner

*Primary Examiner* — Tuan V Thai
(74) *Attorney, Agent, or Firm* — Amin, Turocy & Watson, LLP

(57) ABSTRACT

Storage management is enabled. An example method comprises: receiving an update request for a target object stored in a first storage block to write the updated target object into a second storage block different from the first storage block; determining a candidate object associated with the target object using a search tree, the search tree indicating a hierarchical relation among a plurality of objects, wherein a first node corresponding to the target object and a second node corresponding to the candidate object share a same index node in the search tree; determining whether the candidate object was updated during a past predetermined time period; and in response to the candidate object not being updated during the past predetermined time period, moving the candidate object from a third storage block into a fourth storage block different from the third storage block.

20 Claims, 9 Drawing Sheets

METHOD, DEVICE AND COMPUTER PROGRAM PRODUCT FOR STORAGE MANAGEMENT

RELATED APPLICATION

The present application claims the benefit of priority to Chinese Patent Application No. 201910356190.3, filed on Apr. 29, 2019, which application is hereby incorporated into the present application by reference herein in its entirety.

FIELD

Embodiments of the present disclosure relate to the field of computers, and more specifically, to a method, a device and a computer program product for storage management.

BACKGROUND

In order to enhance the efficiency of data search, people tend to organize the metadata (e.g., key-value pair) with a search tree, such as BTREE and the like. For example, with aid of such data structure like BTREE, people can rapidly locate nodes corresponding to target keys, so as to quickly locate the target data. In recent years, as the scale of the data to be managed is growing, the storage overheads of metadata also increase. Therefore, an effective approach for managing the storage of the metadata becomes the focus of attention.

SUMMARY

Embodiments of the present disclosure provide a solution of storage management.

In accordance with a first aspect of the present disclosure, there is provided a method for storage management. The method comprises: receiving an update request for a target object stored in a first storage block to write the updated target object into a second storage block different from the first storage block; determining, by using a search tree, at least one candidate object associated with the target object, the search tree indicating a hierarchical relation among a plurality of objects, wherein a first node corresponding to the target object and a second node corresponding to the at least one candidate object share a same index node in the search tree; determining whether the at least one candidate object was updated during a past predetermined time period; and in response to the at least one candidate object not being updated during the past predetermined time period, moving the at least one candidate object from a third storage block into a fourth storage block different from the third storage block.

In accordance with a second aspect of the present disclosure, there is provided a device for storage management. The device comprises: at least one processing unit; at least one memory being coupled to the at least one processing unit and storing instructions for execution by the at least one processing unit, the instructions, when executed by the at least one processing unit, causing the device to perform acts comprising: receiving an update request for a target object stored in a first storage block to write the updated target object into a second storage block different from the first storage block; determining by using a search tree, at least one candidate object associated with the target object, the search tree indicating a hierarchical relation among a plurality of objects, wherein a first node corresponding to the target object and a second node corresponding to the at least one candidate object share a same index node in the search tree; determining whether the at least one candidate object was updated during a past predetermined time period; and in response to the at least one candidate object not being updated during the past predetermined time period, moving the at least one candidate object from a third storage block into a fourth storage block different from the third storage block.

In accordance with a third aspect of the present disclosure, there is provided a computer program product. The computer program product is stored in a non-transitory computer storage medium and comprises machine-executable instructions which, when executed by a device, cause the device to perform any steps in the method described in accordance with the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in exemplary embodiments of the present disclosure.

DETAILED DESCRIPTION OF EMBODIMENTS

Figure 1A:
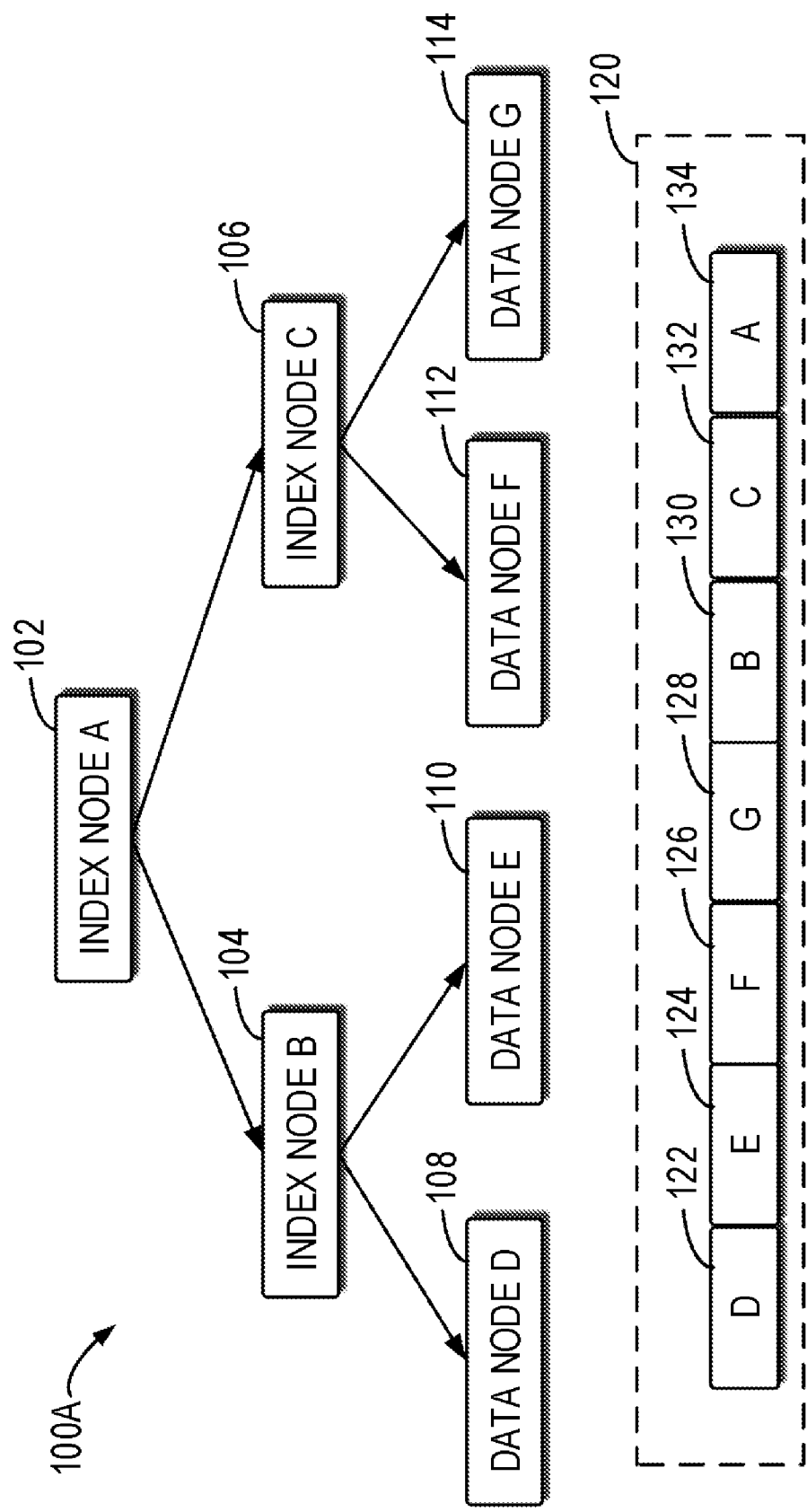
FIGS. 1A to 1C illustrate schematic diagrams of conventional search tree update.

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others may denote different or identical objects. The following text may also contain other explicit or implicit definitions.

As discussed above, in storage systems which use search trees like BTREE, the management of the storage space occupied by data nodes and index nodes has become the focus of attention. For example, FIG. 1A illustrates a schematic diagram of an initial search tree 100A. As shown in FIG. 1, the search tree 100A includes an index node A 102, an index node B 104, an index node C 106, a data node D 108, a data node E 110, a data node F 112 and a data node G 114, wherein data objects (e.g., key-value pair) for searching data are stored in the data nodes while the index nodes store index information of their child nodes for a quick searching of the corresponding data nodes. According to FIG. 1A, initially, data associated with respective nodes in the search tree 100A are sequentially stored in a plurality of storage blocks (storage block 122 to storage block 134) of a storage area 120.

Figure 1B:
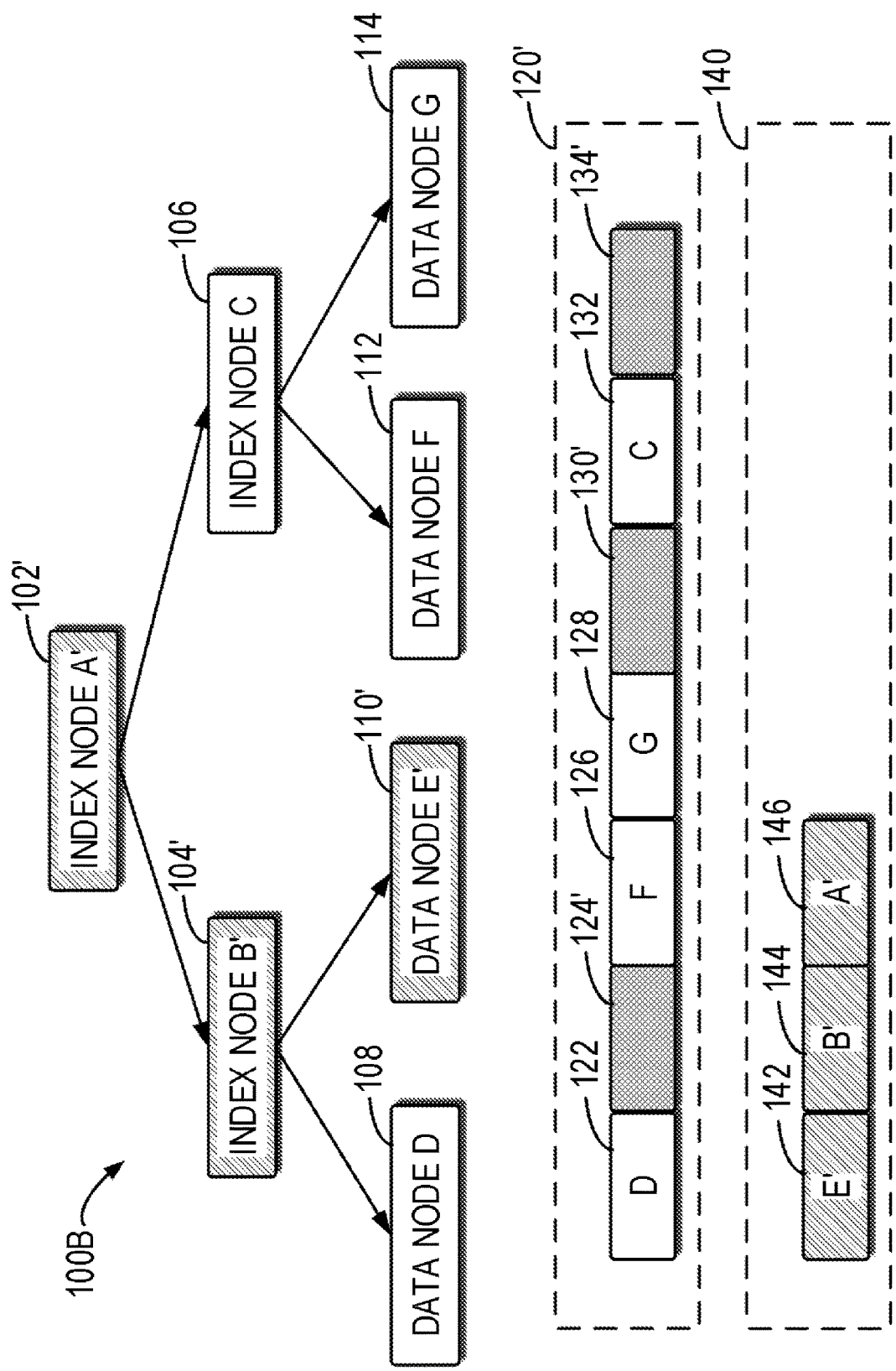

In a data storage system like ECS, when the storage system updates data of a certain node in the search tree 100A, the updated data are written into a new storage block instead of directly replacing data in the previous storage block. As shown in FIG. 1B, when the storage system updates metadata stored in the data node E 110, the storage system may write the updated data into a storage block 142 of the storage area 140 and mark a storage block 124 in the storage area 120' associated with the data node E 110 as free, i.e., updating the storage block 124 to storage block 124'. In addition, the storage system also needs to update accordingly upper-level nodes of the data node E 110, i.e., index node B 104 and index node A 102, to demonstrate that the data node E 110 has been updated. For example, the storage system writes data associated with the updated index node B' 104' and the updated index node A' 102' respectively into storage blocks 144 and 146 of the storage area 140 and mark the previous storage blocks 130 and 134 as free, i.e., updating the storage blocks 130 and 140 to storage blocks 130' and 134' in the storage area 120'. Accordingly, the index node A 102 and the index node B 104 in FIG. 1A are updated to index node A 102' and index node B 104' in FIG. 1B.

Figure 1C:
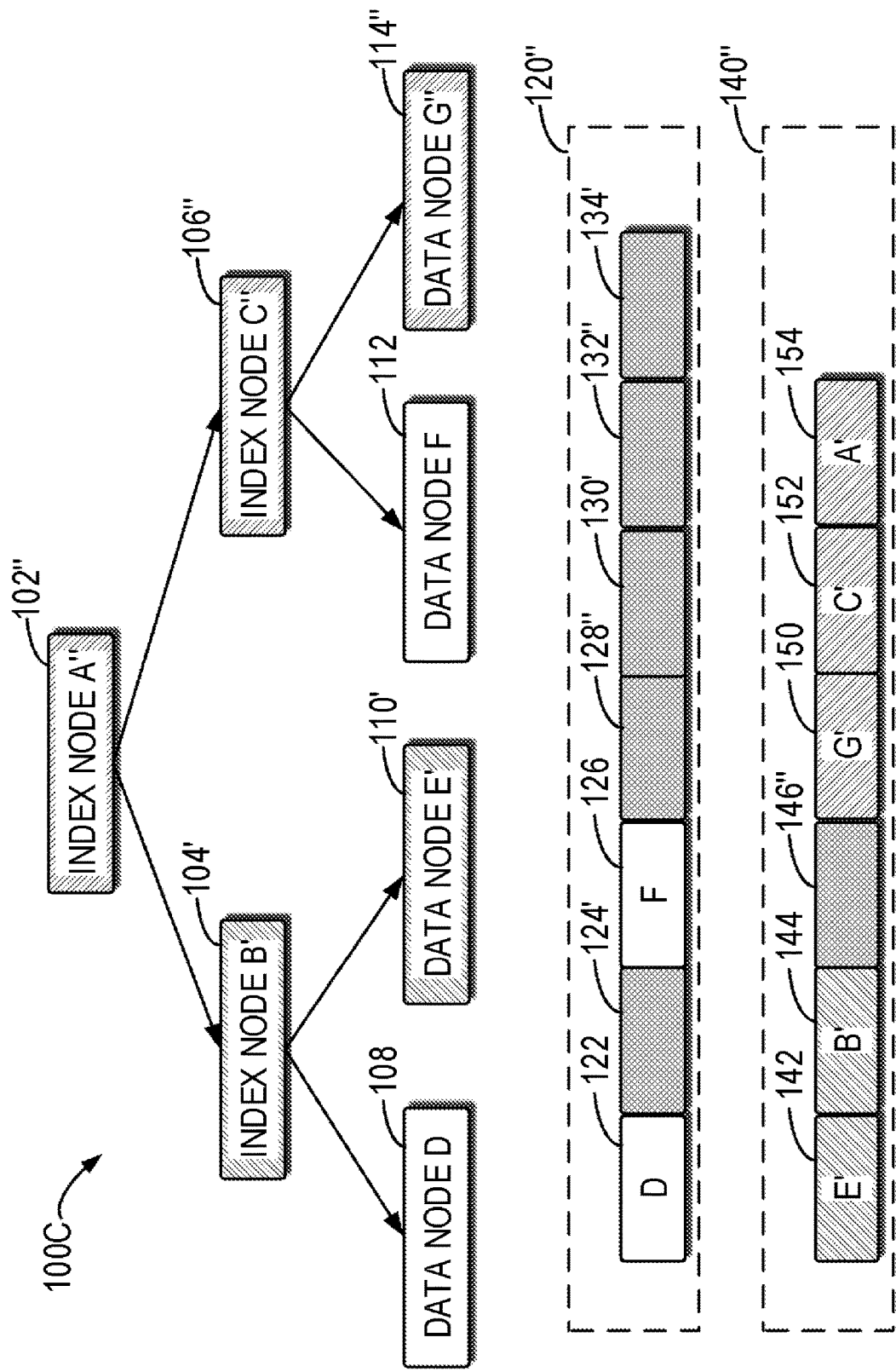

Similarly, as shown in FIG. 1C, when the storage system further requires to update metadata stored in the data node G 114, the storage system writes updated metadata and corresponding index data respectively into new storage blocks 150, 152 and 154 and mark the previous storage blocks 128, 132 and 146 as free, thereby obtaining storage blocks 128", 132" and 146". Accordingly, data node G 114, index node C 106 and index node A 102' are updated to data node G 114", index node C 106" and index node A 102". In this case, the storage area 120" only contains two storage blocks 122 and 126 in service and the free storage blocks occupying a large amount of space cannot be effectively utilized.

Some conventional solutions can release the storage area 120" by moving the data in the storage blocks 122 and 126 to a new storage area, thereby enhancing storage efficiency. However, when the data in the storage blocks are being moved, the storage system also needs to update upper-level nodes associated with the data nodes, which leads to write amplification. For example, in general, one index node can be 64 KB and one data node can be 8 KB. When the metadata stored in the data node D 108 is required to be moved, the storage system needs to write data associated with the data node D 108, the data node B' 104' and the index node A" 102". That is, the size of data to be written is 8 KB+64 KB+64 KB=136 KB. This efficiency cannot be accepted. It should be appreciated that quantity and detailed arrangement of nodes in the search trees demonstrated by FIGS. 1A to 1C are exemplary only and are not intended for limiting the scope of the present disclosure in any manners.

In accordance with embodiments of the present disclosure, there is provided a solution for storage management. In this solution, when an update request for a target object stored in a first storage block is received to write updated target object into a second storage block different from the first storage block, at least one candidate object associated with the target object is determined using a search tree, wherein the search tree indicates a hierarchical relation among a plurality of objects and a first node corresponding to the target object and a second node corresponding to the at least one candidate object have the same index node in the search tree. Then, it is determined whether the at least one candidate object was updated during a past predetermined time period. When the at least one candidate object was not updated during the past predetermined time period, the at least one candidate object is moved from a third storage block to a fourth storage block different from the third storage block. In this way, embodiments of the present disclosure can write candidate objects which were not updated during a predetermined time period while updating the target object, so as to expedite the release of the storage space occupied by these objects. Moreover, as the target object and the candidate object are associated with the same index node, embodiments of the present disclosure also reduce write overheads required for writing the candidate object.

Figure 2:
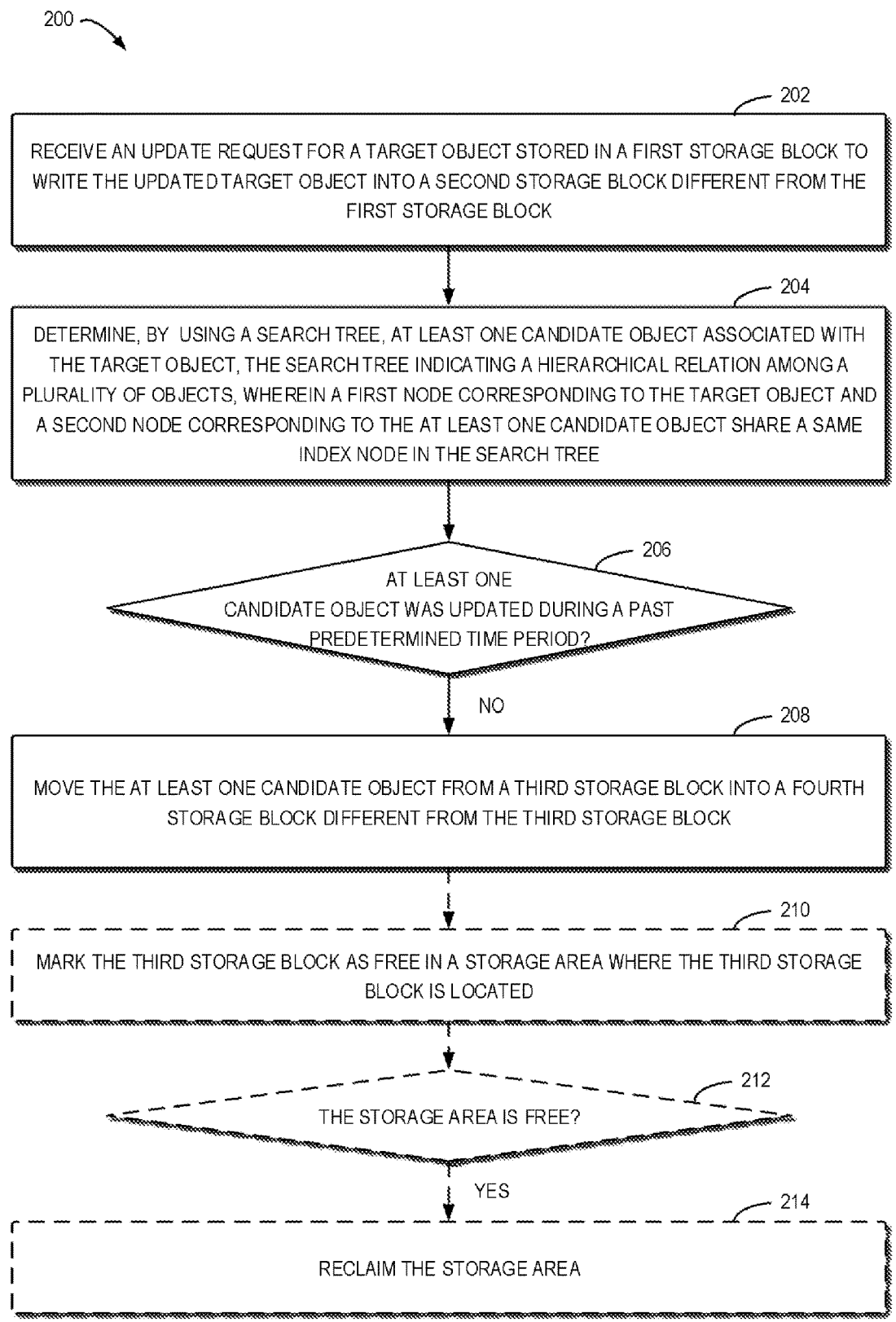
FIG. 2 illustrates a flowchart of a storage management method in accordance with some embodiments of the present disclosure.

A procedure of data backup in accordance with embodiments of the present disclosure is described below with reference to FIG. 2 to FIG. 6. FIG. 2 illustrates a flowchart of a storage management procedure 200 in accordance with some embodiments of the present disclosure. The procedure 200, for example, can be implemented by the storage system configured for executing the storage management.

Figure 3:
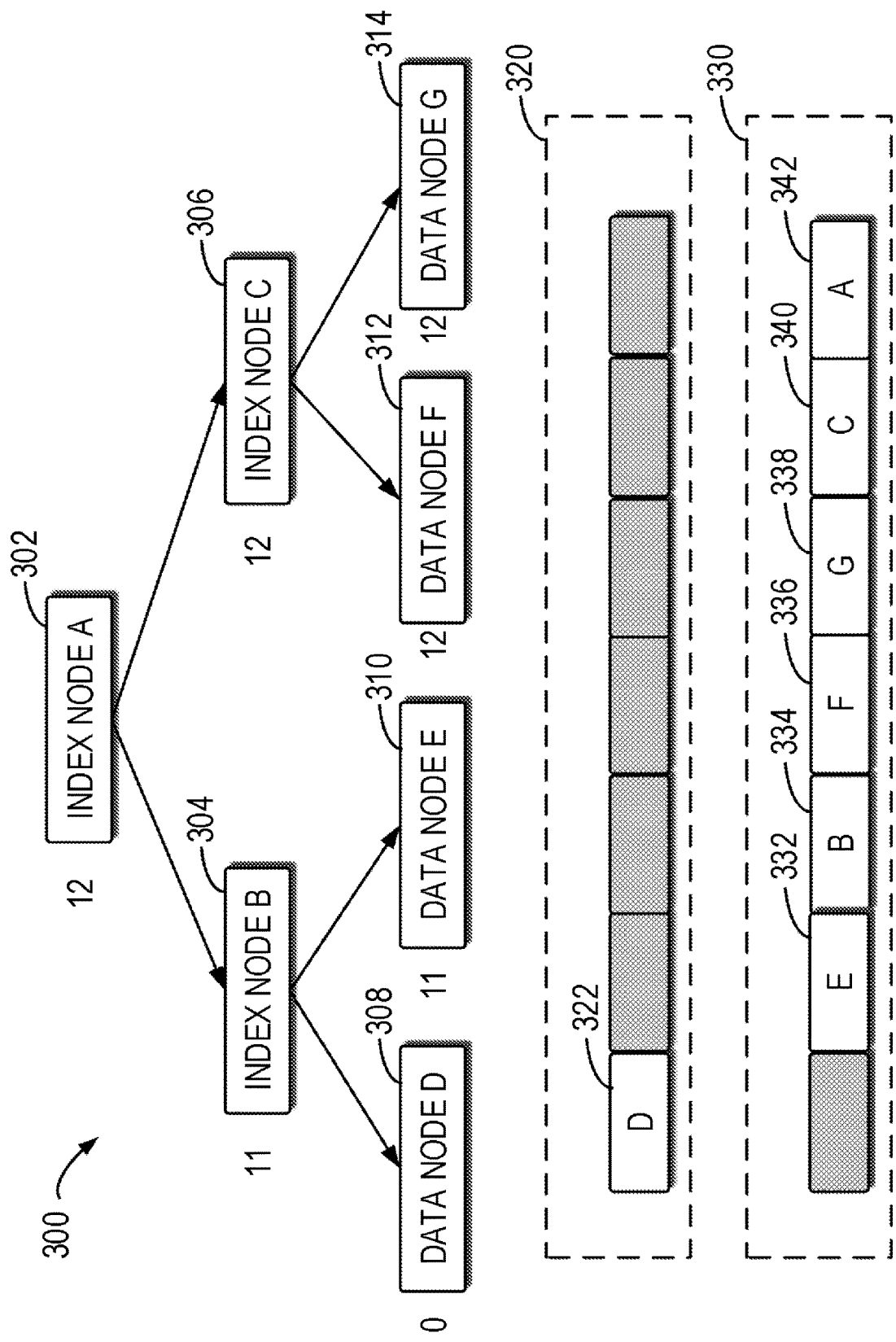
FIG. 3 illustrates a schematic diagram of an example search tree in accordance with embodiments of the present disclosure.

At block 202, the storage system receives an update request for a target object stored in the first storage block to write the updated target object into the second storage block different from the first storage block. The process of the method 200 is described below with reference to the example shown in FIG. 3. Specifically, FIG. 3 illustrates a search tree 300 in the storage system and storage blocks corresponding to respective nodes in the search tree 300. As shown in FIG. 3, metadata stored in the data node D 308 are stored in a storage block 322 of a storage area 320 and data associated with data node E 310, index node B 304, data node F 312, data node G 314, index node C 306 and index node A 302 are respectively stored in storage blocks 332, 334, 336, 338, 340 and 342 of the storage area 330. It should be understood that quantity and arrangement of specific nodes in the search tree demonstrated in FIG. 3 are exemplary only and are not intended for limiting the present disclosure.

Taking FIG. 3 as an example, the storage system can receive an update request for a target object (i.e., metadata contained in the data node E 310) stored in the storage block 332. Based on the update request, the storage system requires to write the updated target object (metadata) into a new storage block. In some embodiments, the target object is a key-value pair for searching data. Through the key-value pair, the storage system can rapidly locate an index value corresponding to a key input by a user and further determine a corresponding target data.

At block 204, the storage system determines at least one candidate object associated with the target object using the search tree, the search tree indicating a hierarchical relation among a plurality of objects, wherein the first node corresponding to the target object and the second node corresponding to the at least one candidate object share a same index node in the search tree. According to FIG. 3, the storage system can read a pre-stored search tree 300 and determine that the node corresponding to the target object is data node E 310 (first node). Moreover, the storage system can determine, based on a pointer relation in the search tree 300, that the parent node is the index node B 304 and further determine that the data node D 308 and the first node 310 have the same index node B 304. The storage system can further determine metadata (i.e., candidate object) in the data node D 308 and determine that the candidate object is stored in the storage block 322 of the storage area 320. The example of FIG. 3 illustrates that only the data node D 308 and the data node E 310 have the same index node 304. It should be appreciated that the index node B 304 may have one or more associated data nodes, which are not shown.

Continue to refer to FIG. 2. The storage system can determine, at block 206, whether the at least one candidate object was updated during a past predetermined time period. The detailed process of block 206 is described below with reference to FIG. 4, which illustrates a flowchart of a process for determining whether the at least one candidate object was updated during the past predetermined time period in accordance with one embodiment of the present disclosure.

Figure 4:
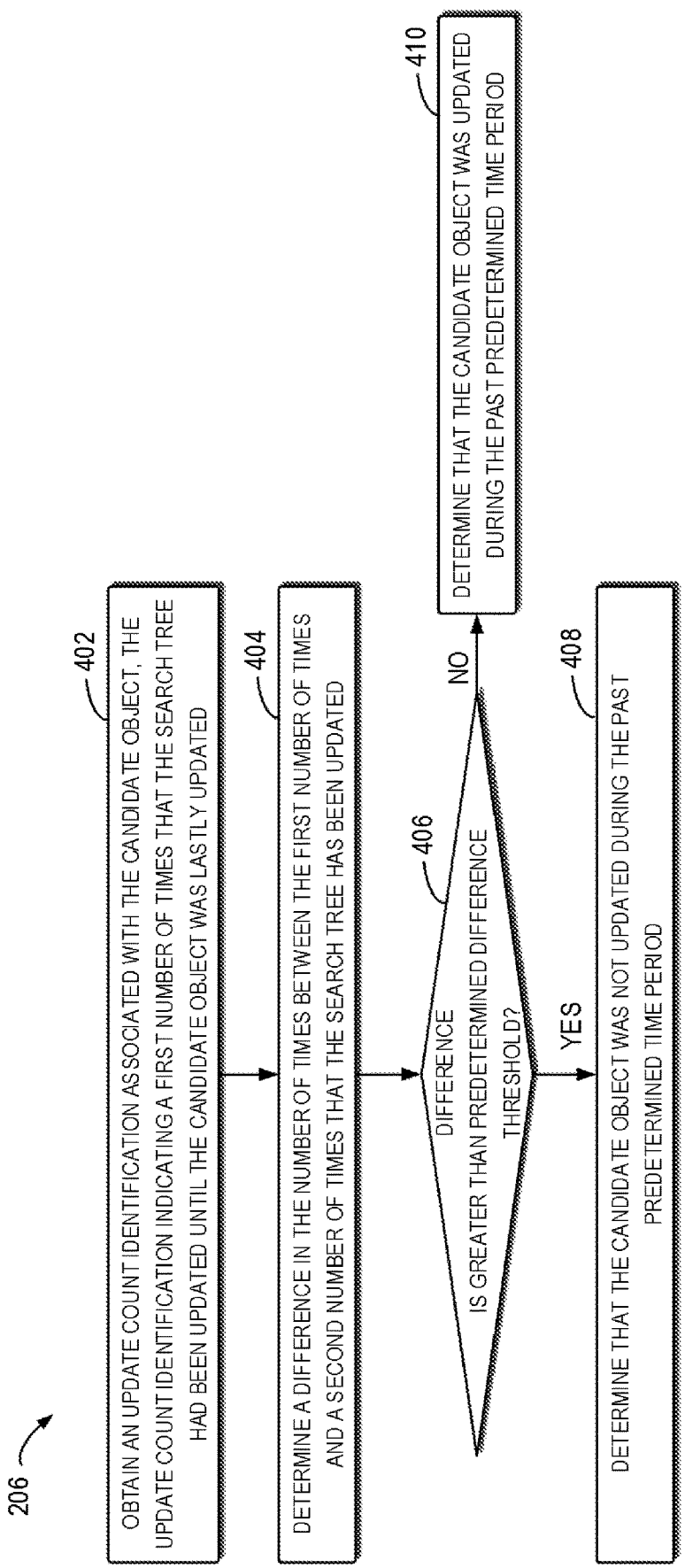
FIG. 4 illustrates a flowchart of a process for determining whether the candidate object was updated during a past predetermined time period in accordance with one embodiment of the present disclosure.

As shown in FIG. 4, at block 402, the storage system may obtain an update count identification associated with one candidate object in the at least one candidate object, wherein the update count identification indicates a first number of times that the search tree had been updated until the candidate object was lastly updated Specifically, in the example of FIG. 3, the storage system can record corresponding update count identifications for each node during each update process. For example, when the search tree is initially built, the storage system can set the initial update count identification to 0 for each node. Then, each time the data node is updated, the storage system can set the update count identification of the data node and its upper-level node to a total number of times that the search tree has been updated. For example, when the first update of the search tree is toward the data node D 308, the storage system can set the update count identifications of the data node D 308, the index node B 304 and the index node A 302 to 1. In some embodiments, the storage system can store the update count identification in association with the data included in the respective nodes. Alternatively, the storage system also can store a dedicated data structure for determining the update count identification and access data structure when determining the corresponding update count identification.

In the example of FIG. 3, the update count identification of the index node A 302, the index node C 306, the index node F 312 and the index node G 314 is 12 (as indicated by the number in front of the block 306); the update count identification of the index node B 304 and the data node E 310 is 11 and the update count identification of the data node D 308 is 0 (i.e., has not been updated since the creation of the search tree 300). As shown in FIG. 3, the update count identification associated with the candidate object is identical to the update count identification (0) associated with the data node D 308.

At block 404, the storage system can determine a difference in the number of times between the first number of times and a second number of times that the search tree has been updated. Continuing to refer to the example of FIG. 3, in this example, the number of times that the search tree has been updated is update count identification (12) of a root index node (index node A 302). Therefore, the count difference can be determined as 12 (12 minus 0).

At block 406, the storage system can determine whether the count difference is greater than a predetermined difference threshold. In response to determining that the difference is greater than a difference threshold at block 406, the method proceeds to block 408, i.e., the storage system can determine that the candidate object was not updated during the past predetermined time period. In some embodiments, in response to determining that the count difference is smaller than or equal to a difference threshold at block 406, the method proceeds to block 410, i.e., the storage system can determine that the candidate object has been updated during the past predetermined time period. In some embodiments, the predetermined difference threshold can be adaptively adjusted according to the actual needs, such that nodes (objects) which have not been updated for a long time can be effectively filtered and no extra write overheads are generated due to frequent data movement. In some embodiments, the storage system can configure an initial value of the difference threshold. For example, the storage system can set the total number of times that the search tree has been updated within two weeks as the initial value. Subsequently, the storage system can compare the number of data nodes to be moved at the initial value with the actual number of updated nodes to adjust the initial value. For example, when the number of nodes to be moved is greater than the number of updated nodes, the storage system can progressively decrease the difference threshold to avoid moving too many nodes. Besides, when the number of nodes to be moved is relatively small and the current value of the difference threshold is below the initial value, the storage system can progressively increase the difference value to improve the storage efficiency.

For example, in the example of FIG. 3, the difference threshold can be set to 10. Therefore, the storage system can further determine that the difference here is greater than the difference threshold and further determine that the data node D 308 and its corresponding metadata were not updated during the predetermined time period.

Based on this approach, embodiments of the present disclosure can utilize the strictly increased update count identification to simply and efficiently determine whether the corresponding object is updated during a predetermined time period. Besides, the approach is adapted to a distributed environment and can eliminate influences brought by different time clocks in the distributed environment.

In some embodiments, the storage system also can determine, whether the candidate object was updated during the past predetermined time period using an update timestamp. Specifically, FIG. 5 illustrates a flowchart of a process for determining whether at least one candidate object was updated during the past predetermined time period in accordance with one embodiment of the present disclosure.

Figure 5:
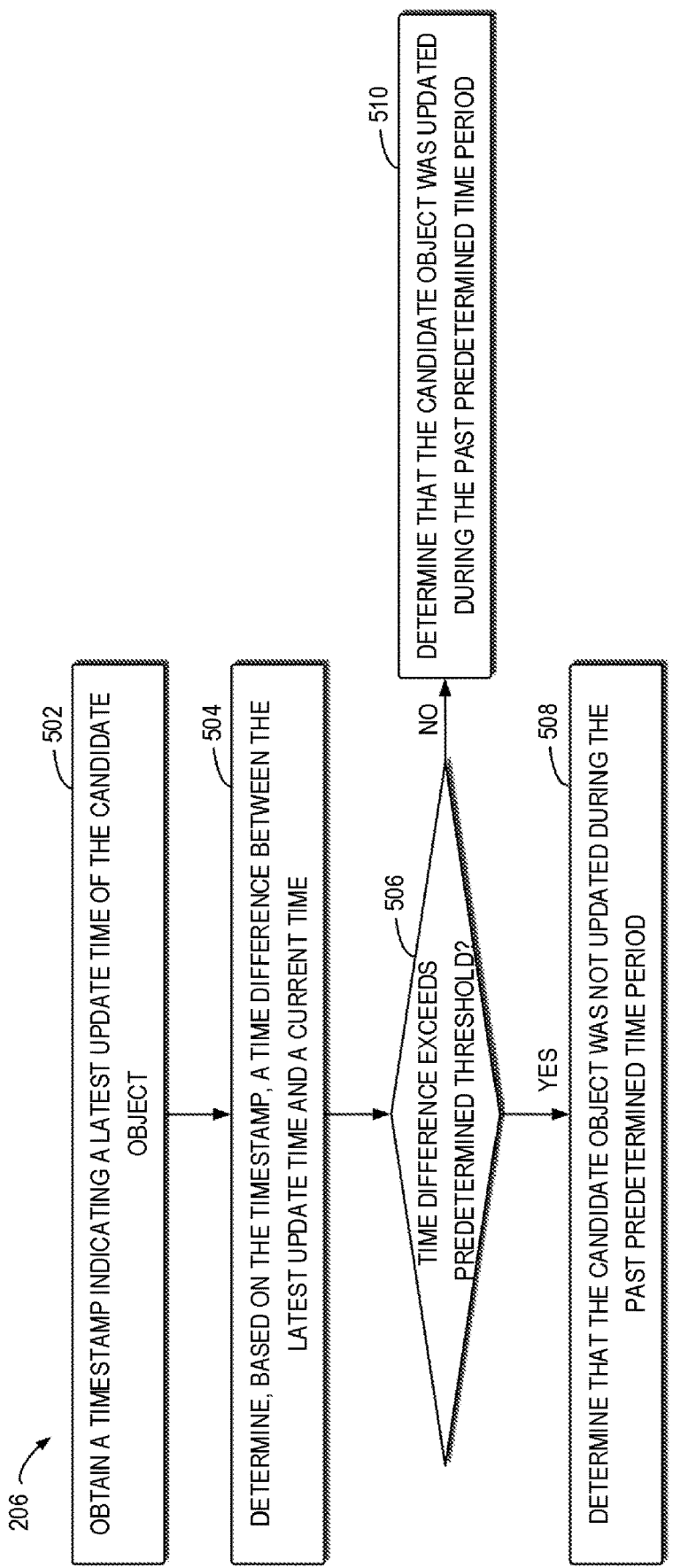
FIG. 5 illustrates a flowchart of a process for determining whether the candidate object was updated during the past predetermined time period in accordance with a further embodiment of the present disclosure.

According to FIG. 5, the storage system can obtain a timestamp indicating a latest update time of the candidate object at block 502. In some embodiments, the storage system can record timestamp information indicating when the update occurs while updating the objects stored in the data node. At block 504, the storage system can determine, based on the timestamp, a time difference between the latest update time and the current time. At block 506, the storage system can determine whether the time difference is greater than a predetermined threshold. In response to determining that the time difference is greater than a predetermined threshold at block 506, the method proceeds to block 508, i.e., the storage system can determine that the candidate object was not updated during the past predetermined time period. In response to determining that the time difference is smaller than or equal to a predetermined threshold at block 506, the method proceeds to block 510, i.e., the storage system can determine that the candidate object was updated during the past predetermined time period. In this way, the storage system can determine, based on the absolute timestamp, whether objects stored within a specific node were updated during the past predetermined time period.

Figure 6:
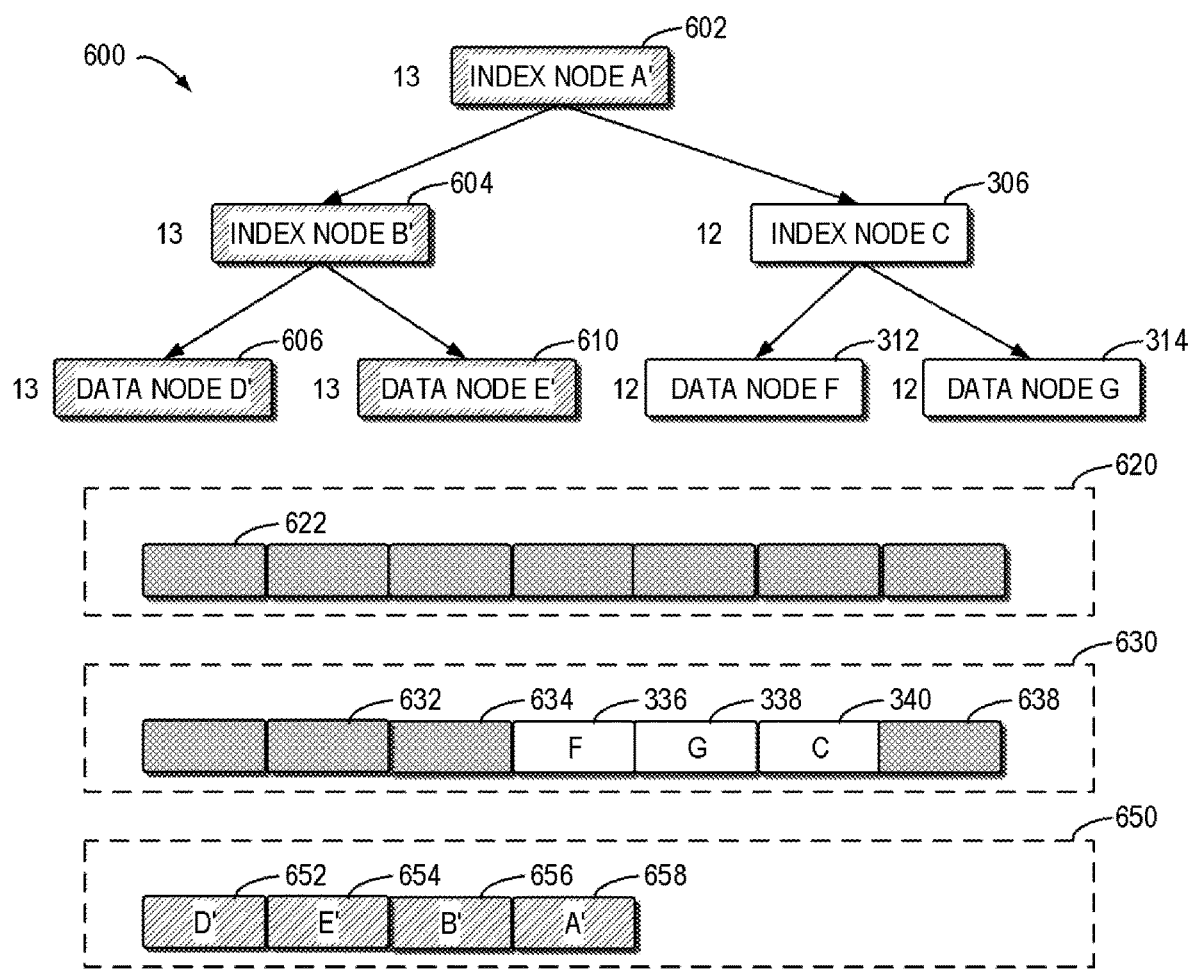
FIG. 6 illustrates a schematic diagram of an example updated search tree in accordance with embodiments of the present disclosure.

Referring back to FIG. 2, in response to determining that the at least one candidate object was not updated during the past predetermined time period at block 206, the method 200 proceeds to block 208, i.e., the storage system moves the at least one candidate object from the third storage block to the fourth storage block different from the third storage block. It should be understood that when it is determined that the at least one candidate object was updated during the past predetermined time period at block 206, the storage system can perform conventional update operations (not shown) on the target data only without handling the candidate objects. The procedure of block 206 is described below with reference to FIG. 6. Specifically, FIG. 6 illustrates a schematic diagram of an updated search tree 600 in accordance with embodiments of the present disclosure. As showed in FIG. 6, when it is determined that the metadata stored in the data node D 308 of FIG. 3 were not updated during a predetermined time period, the storage system can write the data in the storage block D 322 (third storage block) of the storage area 320, together with the metadata in the updated data node E' 610 and the data in the updated index node B' 604 and the index node A' 602 of FIG. 6 into storage blocks 652, 654, 656 and 658 of the storage area 650. Correspondingly, storage blocks 322, 332, 334 and 342 in FIG. 3 can be marked as free, i.e., being updated to free storage block 622 in the storage area 620 and storage blocks 634 and 638 in the storage area 630 of FIG. 6. Accordingly, embodiments of the present disclosure can efficiently move the objects which have not been updated for a long time into new storage blocks without introducing additional write overheads, so as to rapidly release the occupied storage areas.

In some embodiments, the method 200 also can include blocks 210 to 214. Specifically, the storage system, at block 210, marks the third storage block as free in a storage area where the third storage block is located. In the example of FIG. 6, after the data in the third storage block 322 are moved into the storage block 652, the storage system marks the third storage block 322 as free in the storage area 320, i.e., updating the storage block 322 to a storage block 622 in the updated storage area 620.

At block 212, the storage system determines whether the storage area is free. In response to determining that the storage area is free at block 212, the method 200 proceeds to block 214, i.e., the storage system reclaims the storage area. It should be understood that when it is determined that the storage space still has used data at block 212, the storage system may perform no further operation on the storage area (not shown). Specifically, in the example of FIG. 6, the storage system can determine whether all storage blocks in the updated storage area 620 are free, and when it is determined that all storage blocks in the storage area 620 are free, the storage system can release and reclaim the storage area 620. Accordingly, embodiments of the present disclosure also can rapidly release the storage space occupied by data which has not been updated for a long time with a low utilization rate, so as to improve the storage efficiency.

In some embodiments, when the updated data are written into the storage blocks 652, 654, 656 and 658 as shown in FIG. 6, the storage system also can increment the second number of times that the search tree has been updated and update the count identification associated with the at least one candidate object to the incremented second number of times, and update count identifications corresponding to the objects stored in the storage objects. To be specific, according to FIG. 6, after the updated data are written into the storage blocks 652, 654, 656 and 658, the storage system can increment the total number of times that the search tree has been updated from 12 to 13, and the update count identifications associated with the index node A' 602, the index node B' 604, the data node D' 606 and the data node E' 610 are correspondingly set to 13. Therefore, although the metadata stored in the data node D' 606 are not changed, the update count identification is updated to reflect that the corresponding storage blocks is changed.

Figure 7:
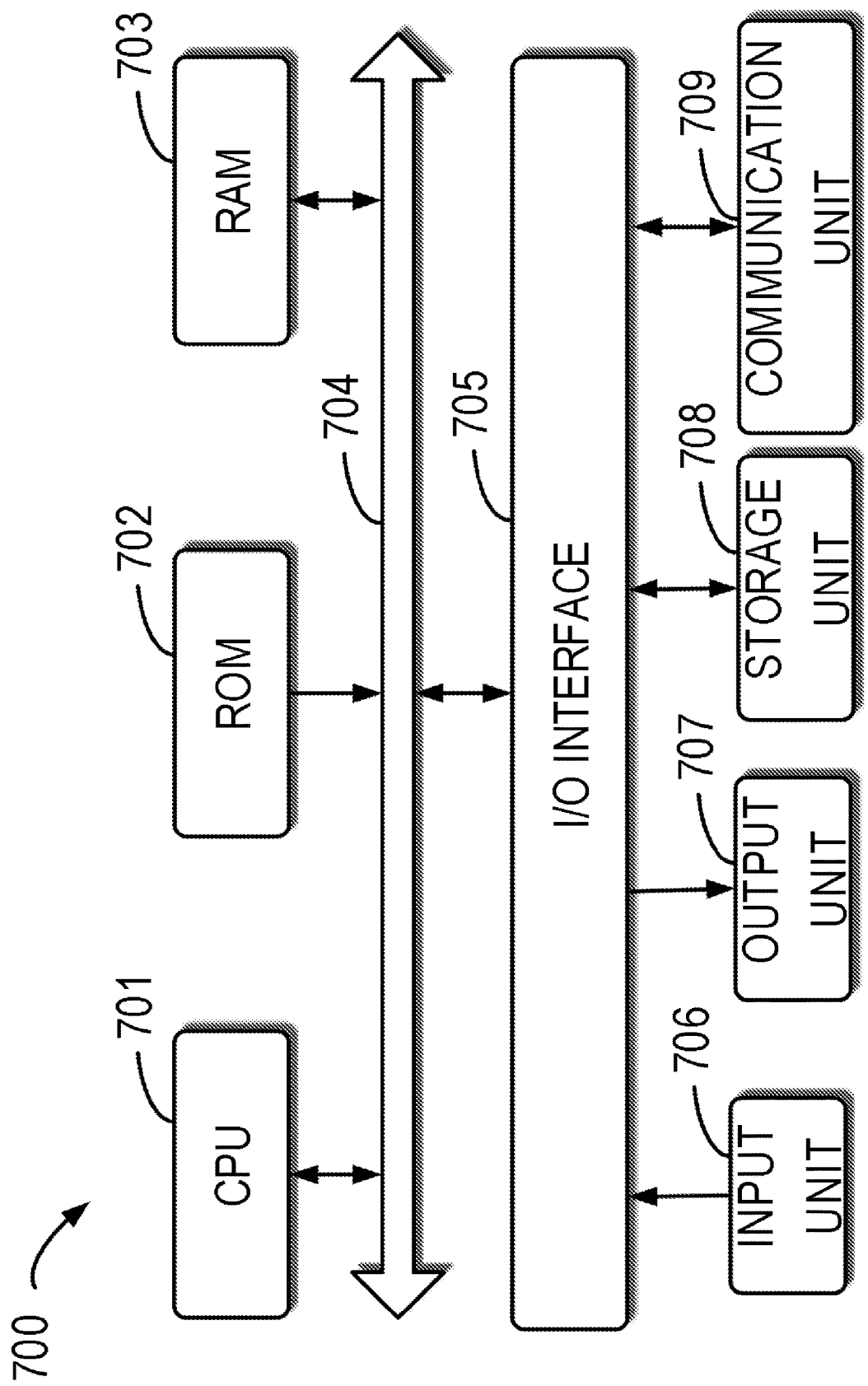
FIG. 7 illustrates a schematic block diagram of an example device for implementing embodiments of the present disclosure.

FIG. 7 shows a schematic block diagram of an example device 700 that can be used to implement embodiments of the present disclosure. For example, the storage system according to embodiments of the present disclosure can be implemented by device 700. As shown, device 700 includes a central processing unit (CPU) 701 that can perform various appropriate actions according to computer program instructions stored in read only memory (ROM) 702 or loaded from storage unit 708 into a random access memory (RAM) 703. In the RAM 703, various programs and data required for the operation of the device 700 can also be stored. The CPU 701, the ROM 702, and the RAM 703 are connected to each other through a bus 704. An input/output (I/O) interface 705 is also coupled to bus 704.

A plurality of components in device 700 are coupled to I/O interface 705, including: input unit 706, such as a keyboard, mouse, etc.; output unit 707, such as various types of displays, speakers, etc.; storage unit 708, such as a disk and an optical unit, etc.; and a communication unit 709 such as a network card, a modem, a wireless communication transceiver, and the like. Communication unit 709 allows device 700 to exchange information/data with other devices over a computer network such as the Internet and/or various telecommunication networks.

The various processes and processes described above, such as method 200, may be performed by processing unit 701. For example, in some embodiments, method 200 can be implemented as a computer software program that is tangibly embodied in a machine readable medium, such as storage unit 708. In some embodiments, some or the entire computer program may be loaded and/or installed onto device 700 via ROM 702 and/or communication unit 709. One or more actions of method 200 described above may be performed when a computer program is loaded into RAM 703 and executed by CPU 701.

The present disclosure can be a method, device, system and/or computer product. The computer product can include a computer readable storage medium with computer readable program instructions for performing various aspects of the present disclosure thereon.

A computer readable storage medium may be a tangible device that can hold and store the instructions used by the instruction execution device. The computer readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: portable computer disks, hard disks, random access memory (RAM), read only memory (ROM), erasable programmable read only memory (EPROM) or flash memory), static random access memory (SRAM), portable compact disk read only memory (CD-ROM), digital versatile disk (DVD), memory stick, floppy disk, mechanical encoding device, for example, the hole card with instructions stored thereon or raised structure in groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or similar programming language. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

What is claimed is:

1. A method, comprising:
receiving, by a system comprising a processor, an update request for an updated target object corresponding to a target object stored in a first storage block to write the updated target object into a second storage block different from the first storage block;

determining, by the system and by using a search tree, at least one candidate object associated with the target object, the search tree indicating a hierarchical relation among a plurality of objects, wherein a first node corresponding to the target object and a second node corresponding to the at least one candidate object share a same index node in the search tree;

determining, by the system, whether the at least one candidate object was updated during a past predetermined time period; and in response to the at least one candidate object being determined not to have been updated during the past predetermined time period, in response to determining that the first node corresponding to the target object and the second node corresponding to the at least one candidate object share the same index node in the search tree, and in response to determining to write the updated target object into the second storage block, moving, by the system, the at least one candidate object from a third storage block into a fourth storage block different from the third storage block.

2. The method of claim 1, further comprising:

marking, by the system, the third storage block as free in a storage area where the third storage block is located; and in response to determining that the storage area is free, reclaiming, by the system, the storage area.

3. The method of claim 1, wherein the determining whether the at least one candidate object was updated during the past predetermined time period includes:

for a candidate object in the at least one candidate object, obtaining, by the system, an update count identification associated with the candidate object, the update count identification indicating a first number of times that the search tree had been updated until the candidate object was lastly updated;

determining, by the system, a difference in the number of times between the first number of times and a second number of times that the search tree has been updated; and in response to the difference being greater than a predetermined difference threshold, determining, by the system, that the candidate object was not updated during the past predetermined time period.

4. The method of claim 3, further comprising:

incrementing, by the system, the second number of times that the search tree has been updated, resulting in an incremented second number of times; and updating, by the system, the update count identification associated with the at least one candidate object to be the incremented second number of times.

5. The method of claim 1, wherein the determining whether the at least one candidate object was updated during the past predetermined time period comprises:

obtaining, by the system, a timestamp indicating a latest update time of the at least one candidate object;

determining, by the system and based on the timestamp, a time difference between the latest update time and a current time; and in response to determining that the time difference exceeds a predetermined threshold, determining, by the system, that the at least one candidate object was not updated during the past predetermined time period.

6. The method of claim 1, wherein the target object is a key-value pair for searching data.

7. A device for storage management, comprising:

at least one processing unit;

at least one memory being coupled to the at least one processing unit and storing instructions for execution by the at least one processing unit, the instructions, when executed by the at least one processing unit, causing the device to perform acts comprising:

receiving an update request for a target object, which has become an updated target object and is stored in a first storage block, to write the updated target object into a second storage block different from the first storage block;

determining, by using a search tree, at least one candidate object associated with the target object, the search tree indicating a hierarchical relation among a plurality of objects, wherein a first node corresponding to the target object and a second node corresponding to the at least one candidate object share a same index node in the search tree;

determining whether the at least one candidate object was updated during a past predetermined time period; and in response to the at least one candidate object not being updated during the past predetermined time period, in response to determining that the first node and the second node share the same index node, and in response to determining to write the updated target object into the second storage block, moving the at least one candidate object from a third storage block into a fourth storage block different from the third storage block.

8. The device of claim 7, wherein the acts further comprise:

marking the third storage block as free in a storage area where the third storage block is located; and in response to determining that the storage area is free, reclaiming the storage area.

9. The device of claim 7, wherein the determining whether the at least one candidate object was updated during the past predetermined time period includes:

for one candidate object in the at least one candidate object, obtaining an update count identification associated with the candidate object, the update count identification indicating a first number of times that the search tree had been updated until the candidate object was lastly updated;

determining a difference in the number of times between the first number of times and a second number of times that the search tree has been updated; and in response to the difference being greater than a predetermined difference threshold, determining that the candidate object was not updated during the past predetermined time period.

10. The device of claim 9, wherein the acts further comprise:

incrementing the second number of times that the search tree has been updated, resulting in an incremented second number of times; and updating the update count identification associated with the at least one candidate object to be the incremented second number of times.

11. The device of claim 7, wherein the determining whether the at least one candidate object was updated during the past predetermined time period comprises:

obtaining a timestamp indicating a latest update time of the at least one candidate object;

determining, based on the timestamp, a time difference between the latest update time and a current time; and in response to determining that the time difference exceeds a predetermined threshold, determining that the at least one candidate object was not updated during the past predetermined time period.

12. The device of claim 7, wherein the target object is a key-value pair for searching data.

13. A computer program product being stored in a non-transitory computer storage medium and comprising machine-executable instructions which, when executed by a device, cause the device to perform actions comprising:

receiving an update request for an updated target object stored in a first storage block to write the updated target object into a second storage block different from the first storage block;

determining, by using a search tree, at least one candidate object associated with the updated target object, the search tree indicating a hierarchical relation among a plurality of objects, wherein a first node corresponding to the updated target object and a second node corresponding to the at least one candidate object share a same index node in the search tree;

determining whether the at least one candidate object was updated during a past predetermined time period; and in response to the at least one candidate object not being updated during the past predetermined time period, in response to determining that the first node and the second node share the same index node, and in response to determining to write the updated target object into the second storage block, moving the at least one candidate object from a third storage block into a fourth storage block different from the third storage block.

14. The computer program product of claim 13, wherein the acts further comprise:

marking the third storage block as free in a storage area where the third storage block is located; and in response to determining that the storage area is free, reclaiming the storage area.

15. The computer program product of claim 13, wherein the determining whether the at least one candidate object was updated during the past predetermined time period includes:

for one candidate object in the at least one candidate object, obtaining an update count identification associated with the at least one candidate object, the update count identification indicating a first number of times that the search tree had been updated until the at least one candidate object was lastly updated;

determining a difference in the number of times between the first number of times and a second number of times that the search tree has been updated; and in response to the difference being greater than a predetermined difference threshold, determining that the at least one candidate object was not updated during the past predetermined time period.

16. The computer program product of claim 15, wherein the acts further comprise:

incrementing the second number of times that the search tree has been updated, resulting in an incremented second number of times; and updating the update count identification associated with the at least one candidate object to be the incremented second number of times.

17. The computer program product of claim 13, wherein the determining whether the at least one candidate object was updated during the past predetermined time period comprises:

obtaining a timestamp indicating a latest update time of the at least one candidate object.

18. The computer program product of claim 17, wherein the determining whether the at least one candidate object was updated during the past predetermined time period comprises:

determining, based on the timestamp, a time difference between the latest update time and a current time.

19. The computer program product of claim 18, wherein the determining whether the at least one candidate object was updated during the past predetermined time period comprises:

in response to determining that the time difference exceeds a predetermined threshold, determining that the at least one candidate object was not updated during the past predetermined time period.

20. The computer program product of claim 13, wherein the updated target object is a key-value pair for searching data.

* * * * *